United States Patent [19]

Heide

[11] Patent Number: 5,677,909
[45] Date of Patent: Oct. 14, 1997

[54] APPARATUS FOR EXCHANGING DATA BETWEEN A CENTRAL STATION AND A PLURALITY OF WIRELESS REMOTE STATIONS ON A TIME DIVIDED COMMNICATION CHANNEL

[75] Inventor: Carolyn Heide, Lincolnshire, Ill.

[73] Assignee: Spectrix Corporation, Deerfield, Ill.

[21] Appl. No.: 241,037

[22] Filed: May 11, 1994

[51] Int. Cl.$^6$ ................................................. H04J 3/16
[52] U.S. Cl. ................................................ 370/347; 370/461
[58] Field of Search .......................... 370/95.1, 95.2, 370/95.3, 85.2, 85.3, 85.7, 85.8, 85.13, 94.1, 60, 60.1, 94.2, 310, 321, 324, 329, 337, 338, 346, 347, 350, 400, 420, 421, 413, 414, 427, 445, 447, 449, 454, 458, 459, 461, 503; 340/825.08; 375/356; 445/33.1, 4.1, 5.1, 51.1, 54.2

[56] References Cited

U.S. PATENT DOCUMENTS

| | | | |
|---|---|---|---|
| 5,012,469 | 4/1991 | Sardana | 370/94.1 |
| 5,276,703 | 1/1994 | Budin et al. | 370/85.2 |
| 5,297,144 | 3/1994 | Gilbert et al. | 370/95.2 |

*Primary Examiner*—Douglas W. Olms
*Assistant Examiner*—Dang Ton
*Attorney, Agent, or Firm*—Welsh & Katz, Ltd.

[57] ABSTRACT

An apparatus is provided for exchanging data between a central station and a plurality of wireless remote stations on a time division multiple access communication channel. The apparatus includes device for receiving access requests from remote stations of the plurality of remote stations during a first time interval under a contention based protocol and a non-contention based protocol and device for polling for data transfers during a second time period remote stations of the plurality of remote stations providing access requests under non-contention based protocols during the first time period.

5 Claims, 7 Drawing Sheets

FIG. 4a

RSYNC-Request Sync
MRSYNC-Mandatory Request Sync

| Preamble | |
|---|---|
| SD | |
| DID | < Broadcast |
| SID | < ID of originating controller |
| Type | < RSYNC or MRSYNC |
| Control | < Control flags: AP |
| Version | < Software version |
| TotalSlots | < Total number of time slots in SyncPeriod (including RegSlots) |
| RegSlots | < Total number of time slots which are for registration only |
| SuperFrame | < Superframe number |
| FCS | |
| ED | |

(INFO spans Type through SuperFrame)

DSYNC-Data Sync

| Preamble | |
|---|---|
| SD | |
| DID | < Broadcast |
| SID | < ID of originating controller |
| Type | < DSYNC |
| Control | < Control flags: AP |
| UpLength | < length of Upward Data Period |
| SuperFrame | < Superframe number |
| FCS | |
| ED | |

(INFO spans Type through SuperFrame)

EDSYNC-Extended Data Sync

| Preamble | |
|---|---|
| SD | |
| DID | < Broadcast |
| SID | < ID of originating controller |
| Type | < DSYNC |
| Control | < Control flags: AP |
| UpLength | < length of Upward Data Period |
| BCastLength | < length of Broadcast Data Period |
| DownLength | < length of Downward Data Period |
| ListLength | < length of following list |
| List | < list of stations for which there is downward data in this superframe |
| SuperFrame | < Superframe number |
| FCS | |
| ED | |

(INFO spans Type through SuperFrame)

FIG. 4b

RegRTS-Registration Request

| Preamble | |
|---|---|
| SD | |
| DID | < Destination Station ID |
| SID | < registration slot number ( temporary station ID) |
| Type | < regRTS |
| Control | < Control flags: none used |
| Version | < Software version |
| SA | < Address station registering, 48-bit address |
| FCS | |
| ED | |

INFO: Version, SA

RTS-Request To Send

| Preamble | |
|---|---|
| SD | |
| DID | < Destination Station ID |
| SID | < Source Station ID |
| Type | < RTS |
| Control | < Control flags: AP, sequence, out-of-sequence, retry, more |
| DataCount | < Number of data frames station wants to send to DA |
| DataLength | < Length, in octets, of data the source wants to send |
| DA | < Address station to which data is to be sent, 48-bit address |
| FCS | |
| ED | |

INFO: DataCount, DataLength, DA

FORF-Forfeit

| Preamble | |
|---|---|
| SD | |
| DID | < Destination Station ID |
| SID | < Source Station ID |
| Type | < FORF |
| Control | < Control flags: none used |
| FCS | |
| ED | |

RegCTS-Registration Clear to Send

| Preamble | |
|---|---|
| SD | |
| DID | < Destination Staion ID |
| SID | < ID of originating controller |
| Type | < ReCTS |
| Control | < Control flags: AP |
| ID | < ID assigned to station |
| SA | < Address station registering, 48-bit address |
| FCS | |
| ED | |

INFO: ID, SA

FIG. 4c

CTS-Clear To Send

| Preamble | |
|---|---|
| SD | |
| DID | < Desination Station ID |
| SID | < Source Station ID |
| Type | < CTS |
| Control | < Control flags: AP, sequence, out-of-sequence |
| FCS | |
| ED | |

DATA- Data

| Preamble | |
|---|---|
| SD | |
| DID | < Destination Station ID |
| SID | < Source Station ID |
| Type | < DATA |
| Control | < Control flags: AP, sequence, out-of-sequence, retry, more |
| SA | < Address of data originator, 48-bit address |
| DataLength | < Length, in octets, of data to be sent |
| Data | < Data |
| FCS | |
| ED | |

INFO: Control through Data

MDATA-Management Data

| Preamble | |
|---|---|
| SD | |
| DID | < Destination Station ID |
| SID | < Source Station ID |
| Type | < MDATA |
| Control | < Control flags: AP, sequence, out-of-sequence, retry, hierarchical |
| SA | < Address of data originator, 48-bit address |
| MType | < Type of management message |
| Data | < according to MType |
| FCS | |
| ED | |

INFO: Control through Data

Acknowledge

| Preamble | |
|---|---|
| SD | |
| DID | < Destination Station ID |
| SID | < Source Station ID |
| Type | < ACK |
| Control | < Control flags: AP |
| FCS | |
| ED | |

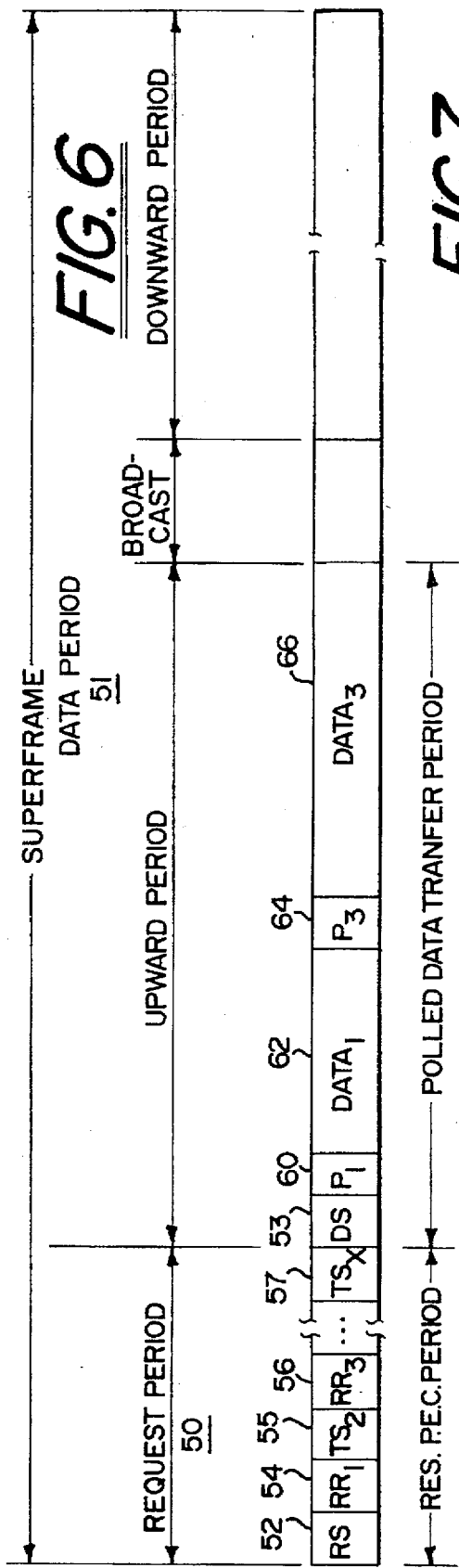

APPARATUS FOR EXCHANGING DATA BETWEEN A CENTRAL STATION AND A PLURALITY OF WIRELESS REMOTE STATIONS ON A TIME DIVIDED COMMNICATION CHANNEL

BACKGROUND OF THE INVENTION

This invention generally relates to the field of data communications networks. More particularly, this invention pertains to a multiple access protocol for a data communications network having a number of users exchanging data between individual remote stations to a central station over a single optical infrared channel.

A multipoint digital communications network typically consists of a number of remote stations which communicate with a central station over one or more two-way communications channels. For example, personal computers are typically connected to a wide variety of peripherals or other computers via wire cables, i.e., a hard-wired communications link. Moreover, local area networks (LAN's) are often used to integrate remote terminals that are located at the same site. Depending upon the number of users, distance between terminals, number of peripherals, frequency of system reconfiguration, portability of the remote stations, etc., the hard-wired cable system may not be practical for a given application. Hence, various wireless communication technologies have been employed, particularly when a system includes a large number of users and/or portable, hand-held computer devices.

Among the more common wireless technologies are narrow-band radio frequency (RF) systems, spread spectrum RF, ultrasonic, and infrared optical. Radio frequency systems are often significantly degraded by electromagnetic noise and interference, as well as by large signal amplitude variations and multipath interference. Moreover, RF systems are typically subject to governmental licensing and regulation. Alternative wireless systems employing ultrasonic sound waves experience severe problems with the complete loss of signals due to nulls in the transmission path.

Optical-infrared communications, however, is not affected by electromagnetic interference, and is much less susceptible to multipath interference. Furthermore, optical systems are inherently secure (since the infrared light does not penetrate walls), have no known health or safety effects, and are not subject to F.C.C. regulation. Moreover, infrared transceivers draw relatively low currents, which is particularly important with respect to hand-held battery-powered portable computers. Thus, the use of infrared light as the wireless medium is well suited to such applications.

In order for the remote stations to communicate with the central station, the remote stations must be able to gain access to the commonly-shared communications channel using some type of multiple-access signalling or control protocol. As used in the data communications field, a "protocol" is a formal set of rules governing the format and control of inputs and outputs between two communicating devices in order to ensure the orderly transfer of information. Typical multiple-access protocols may be categorized into two broad classes: contention-based protocols (i.e., random access), and noncontention-based protocols, (i.e., scheduled access). Contention-based protocols are characterized in that any remote user with a data message can contend for the channel by transmitting its data message immediately in an on-demand fashion, taking the chance that no other remote stations will transmit at the same time and thus collide with it. When a collision occurs, the data message is seldom received correctly, if at all. Since there is no coordination between contending remote stations, the number of collisions dramatically increases as the number of users increase, or as the channel load increases. Hence, contention-based protocols are not suitable for many data communications applications.

Noncontention-based protocols are characterized in that they provide the necessary coordination between the remote stations to ensure that no two remote stations transmit at the same time to contend for the channel. In other words, the users in a noncontention system take turns accessing the network in an orderly fashion such that collisions between users are avoided. Noncontention channel access is usually implemented using some type of polling technique, wherein the central station sends a control message or synchronization signal to the remote stations as an indication for the remote to respond by transmitting data on the channel.

Using the well-known "explicit polling" technique, the central controller sends a polling signal to each remote station, individually, to inquire if the remote has any information to send. A "poll list" of remote station addresses is used by the central controller to determine when a remote station is to be polled. If the polled remote station doesn't have a data message to send over the channel, the central controller goes on to poll the next remote. If the remote station does have a message to send, the data message is immediately transmitted over the channel in response to the poll. As used herein, the term "polling" includes the second-half of the procedure, wherein the polled stations return a message. Explicit polling has traditionally been considered rather inefficient, since each remote station has to wait for its individualized poll, establish bit and character synchronization, and then transmit its data message in response to the poll. Hence, a significant portion of the overall channel capacity is consumed by the polling signals themselves.

Another noncontention-based multiple-access protocol is referred to as "implicit polling." Under the implicit polling technique, each timing cycle on the channel is divided into a number of time slots, and a specific time slot within each cycle is reserved for a particular remote station. Each remote station, which is synchronized in time with the central station, is implicitly granted access to the channel during its individual time slot. In other words, the channel access is controlled by reserving time slots for each remote station to transmit, rather than being controlled by explicit polling signals from the central station.

In multipoint data communications networks using the implicit polling protocol, a fixed transmission time slot is reserved for each remote station in the network. Each time slot must be of a sufficient length to contain an entire data message packet. Hence, the channel is efficiently utilized only if each remote station has a data message to send during each cycle. If, however, only a few of the remote stations have messages to send during each cycle, then the channel remains idle during the preassigned time slots allocated to these non-responsive remote stations. When only a fraction of the remote users have data messages to send, an enormous amount of channel capacity is wasted in the empty time slots of an implicit polling system.

One advance over the prior art was provided by U.S. Pat. No. 5,297,144 ("the '144 patent") assigned to the same assignee as the present invention. The No. '144 patent avoids some of the disadvantages of explicit and implicit polling by periodically allowing remote data stations to register a need for a data transmission with the Central station under an implicit polling format. Registration is allowed under the No. '144 patent whenever the central station transmitted a reservation sync ("RS") frame. Contention was avoided following the RS frame by assigning different delay periods to each remote terminal for transmission of an access request following the RS frame.

Under the No. '144 patent a relatively fixed time period was allocated for the RS frame and access requests ("the reservation request period"). Following the reservation request period a second, variable length, time period is allowed for polling the remote station and for transfer of data from the requesting remotes ("the polled data transfer period").

While the No. '144 patent ostensibly reduces power consumption within the remote stations through use of "sleep modes" such power savings is not practical where a remote station is to receive data from the control station. Under the teachings of the No. '144 patent, a remote station remains active during the polled data transfer mode (does not enter the sleep mode) only long enough to be polled and transfer data. Since data transfer from the central station to the remote station occurs at the end of the polled data transfer mode, and since the polled data transfer mode is of variable length, the sleep mode of the No. '144 patent cannot be used where data is to be transferred from the central unit to remote stations.

The No. '144 patent also allows for the addition of new remote stations to the relatively fixes reservation request period through the use of a "membership acquisition period". The membership acquisition period is a multiframe structure within the superframes after the polled data transfer period ("PDTP") wherein the central station accepts new remote stations (inserts new slots within the reservation request period). The membership acquisition period is a fixed time period within the superframe wherein a new remote station (or group of new remote stations) may seek to gain access to the communication system.

While the No. '144 patent has provided a significant advance over the prior art, the No. '144 patent still fails to provide a convenient method of coping within rapid membership changes. The No. '144 patent also fails to address the issue of power savings where downlink transmissions must occur between the central station and remote stations. Because of the importance of power savings in portable data devices linked to a central station, a need exists for a method and means of remote station power control under dynamic loading conditions involving the two-way exchange of data between remote stations and the central station.

SUMMARY OF THE INVENTION

An apparatus is provided for exchanging data between a central station and a plurality of wireless remote stations on a time divided communication channel. The apparatus includes means for receiving access requests from remote stations of the plurality of remote stations during a first time interval under a contention based protocol and a non-contention based protocol and means for polling during a second time period remote stations of the plurality of remote stations providing access requests under non-contention based protocols during the first time period.

The apparatus also allows remote stations to exchange data directly. Such direct exchange is possible where the central station acts to coordinate such exchanges while deferring the enablement of other users which may interfere on the communication channel.

Another aspect of the invention provides a second time period where data may be transferred from the central station to individual remote stations. A structure for broadcasting common information to all remote stations is also provided within the second time frame.

BRIEF DESCRIPTION OF THE DRAWINGS

The features of the present invention which are believed to be novel are set forth with particularity in the appended claims. The invention itself, however, together with further objects and advantages thereof, may best be understood with reference to the following description when taken in conjunction with the accompanying drawings, in which:

FIGS. 4A–C provides a summary of network control function by frame type in accordance with the invention along with a description of frame content within individual fields of the frame;

FIG. 6 is a timing cycle diagram similar to that of FIG. 3 illustrating slot usage.

FIG. 7 is a timing cycle diagram similar to that of FIG. 6, wherein acknowledgement signals are returned to the remote stations after each data message;

FIGS. 8a and 8b are timing diagrams representing the power consumption of the remote station receiver and transmitter, respectively, during the reservation-based polling protocol timing cycle and data exchange of FIG. 7;

DETAILED DESCRIPTION OF THE PREFERRED EMBODIMENTS

The solution to the problem of power savings in a dynamically loaded system requiring the two-way exchange of data between remote stations and a central station lies, conceptually, in mixing contention and non-contention based access protocols and in mapping a data transfer period into uplink and downlink epochs. The prior art has taught that either contention based protocols or non-contention based protocols may be used within access periods gaining entry to a multiple access system. Under the invention, it has been determined that an unexpected increase in efficiency may be achieved by using non-contention access protocols for remote stations requiring frequent data exchanges and contention access protocols to remote stations with less frequent data exchanges.

Mapping of data transfer periods, on the other hand, improves efficiency (reduces power consumption) by allowing an indicia of epoch locations to be transferred to remote stations at predetermined intervals. The indicia of epoch location may then be used by the remote stations to deactivate unnecessary power consuming devices during periods of inactivity.

Figure 1:
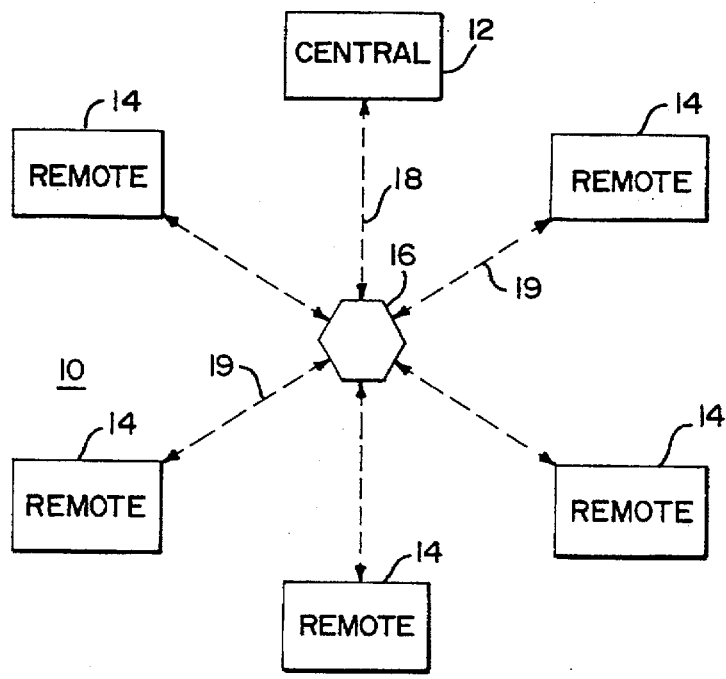
FIG. 1 is a general block diagram of the wireless data communications network according to the present invention.

Referring now to FIG. 1, a general block diagram of a wireless multipoint data communications system 10 is shown. The system comprises a central station 12 and a number of remote stations 14. The central station 12 may be a stand-alone data processing and control entity or may be an access point (AP) used in conjunction with other data processors and systems over a larger hard-wired network.

Central station 12 communicates with remote stations 14 through an optical infrared transceiver 16 coupled to the central station via a hard-wired link 18. Each of the remote stations 14 includes an optical infrared transceiver which communicates with the central station by sending and receiving data messages over an infrared link 19. Depending upon the type of network, the central station may utilize the data messages itself, or route the data messages on to a different station in a local area network.

In the preferred embodiment, each of the remote stations is a portable, hand-held, battery-powered computer having an integrated infrared transceiver, as will be described in detail below. The remote stations also include a keypad for data input, and a display for data output. Although the present invention is particularly adapted for two-way communications over a single-frequency infrared channel transmitting bursts of data packets in the half-duplex mode of operation, the present invention can also be used in full-duplex operation as well as half-duplex operation over single-frequency or split-frequency channels. In the preferred embodiment, infrared link 19 has a 4 Megabit data rate using Return To Zero with Bit Insertion (RZBI) encoding scheme. However, the present invention is not limited for use with only wireless links or the particular type of channel or data communications scheme shown here.

Figure 2:
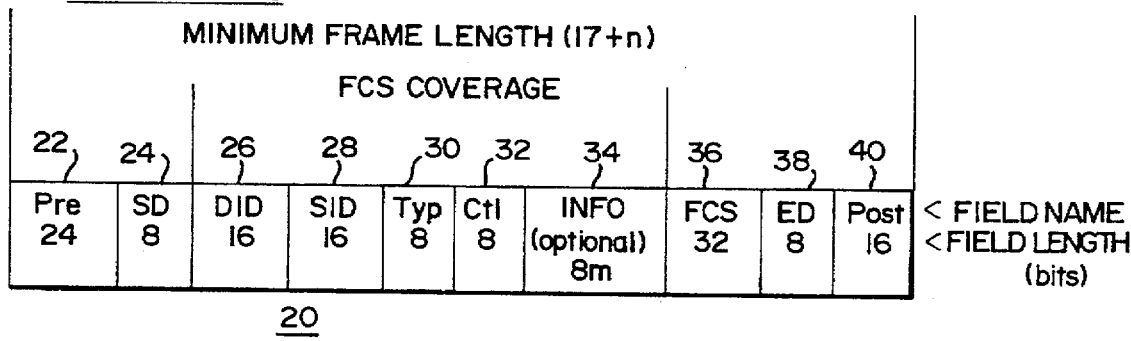
FIG. 2 is a pictorial representation of the channel frame format utilized in the multiple-access signalling protocol of the present invention.

FIG. 2 illustrates the specific channel frame format 20 used under the protocol for all information transfer and supervisory commands. The frame format of the invention basically follows the High-level Data Link Control (HDLC) data communications line protocol specification of the CCITT, or the Synchronous Data Link Control (SDLC) protocol specified by IBM. Hence, the published detailed specifications for the HDLC or SDLC protocols may be referred to for a further understanding of the common subject matter.

As shown in FIG. 2, each frame is subdivided into a number of individual fields, wherein each field is comprised of a number of 8-bit bytes. The following paragraphs describe channel frame format 20:

Preamble (PRE) 22.: This field is a 3-byte field whose purpose is to provide a means of establishing bit synchronization of the receiver with the received signal including the clock recovery signal. The value of the preamble is typically chosen to have a high content of transitions (e.g., "FFFFFF" because in RZBI encoding each "1" bit provides a high-low transition).

Start Delimiter (SD) 24: The purpose of the SD frame is to provide byte synchronization within the receiver. The 8 contiguous bits of the pattern provide a clear indication of the boundary between the "1" bits of the PRE and the bits of the SD. It is a unique "illegal" data structure because the bit insertion of the modulation scheme prevents this number of contiguous zero bits from occurring within the data (anyplace between the SD and ED fields).

Destination Identifier (DID) 26: This field contains the 2-byte address of the station to which the frame is being sent. In other words, in a polling frame, the DID field of a frame transmitted to a remote station first identifies the particular remote station being polled by the central station and then the DID field of a return frame identifies the central station as the destination for the data message being returned by the remote station. Each of the stations is assigned a unique identification code, or address. The remote stations typically receive a new DID address each time the remote station registers with the network 10. However, a dynamic address determination procedure could also be used. In the preferred embodiment, the addresses of remote stations (non-controller stations) begin with hex and increase to the maximum amount of remote stations allowed in the network (e.g., 7 FFF hexadecimal). Controller stations (e.g., central station 12) may be assigned other numerical values (e.g., 8000-EEED hexadecimal). A value of FFFF hex in this field denotes a broadcast frame, which would be received by all stations.

Source Identifier (SID) 28: This field is the 2-byte address of the station sending the frame. To ensure the integrity of the data being transmitted, both the destination and source addresses are included within each frame.

Type of Field (TYP) 30: The 1-byte field indicates to the receiver how to interpret the frames contents and in effect provides a control function. A summary of the possible types of frames are as follows: RSYNC, MRSYNC, RegRTS, RTS, FORF, DSYNC, EDSYNC, RegCTS, CTS, DATA, MDATA, and ACK. The meaning and content of the types of frames listed may be best understood by reference to FIGS. 4A–C. The use of the frames may be best understood by reference to subsequent sections.

Control Flags: This is a 1-byte control field containing bit-mapped flags, primarily used for supervising commands. In the preferred embodiment, control field 32 includes priority flags and retransmissions flags, which will be described below.

Information (INFO) 34: This is a variable length field used for transferring data. The INFO field 34 is also used in conjunction with certain types of frames (e.g., RSYNC, MRSYNC, DYSNC, and EDSYNC) as a repository for an indicia of epoch location (e.g., the location of upward data transfer period (upward period), broadcast period and downward data transfer period (downward period) within the overall data exchange period (data period)).

Frame Check Sequence (FCS) 36: This 4-byte field is used to detect bit errors which may occur during transmission. In the present embodiment, a 32-bit cyclic redundancy check (CRC) algorithm is used to detect errors in fields 26, 28, 30, 32, and 34.

End Delimiter (ED) 38 and postamble (Post) 40: The purpose of the ED 38 is to allow the receiver to detect an end of frame. The purpose of the POST 40 is to prevent the receiver from mistaking an ED/POST combination for an SD/DID combination in that the hexadecimal value of 0EEEE could be an invalid DID.

Figure 3:
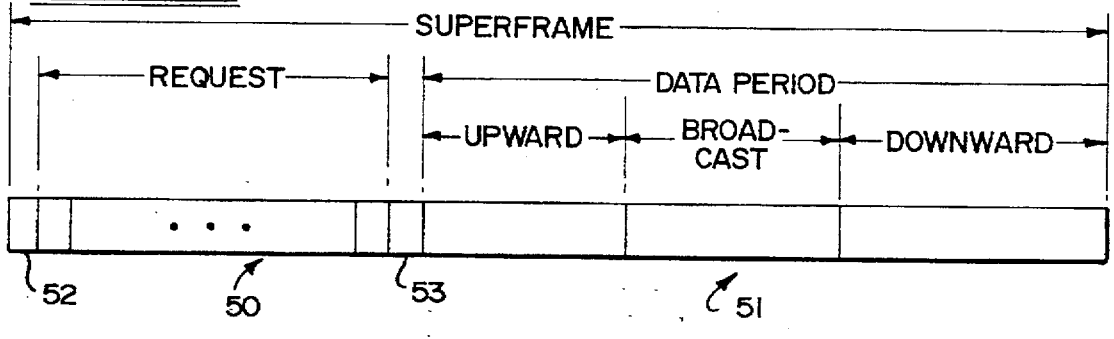
FIG. 3 is a timing cycle diagram illustrating the two-stage reservation-based polling protocol and data exchange system of the present invention.

FIG. 3 illustrates a repeating frame structure (superframe) used by the system 10 to exchange information between the central station 12 and the remote station 12. Each frame making up the superframe has the frame format described above.

Superframes are not always of the same temporal length. The superframe, in turn, may be divided into a variable length period used for receipt of access requests (request period) 50 and a variable length field used for data exchanges (data period) 51.

The central station 12 identifies the beginning of the superframe to the remote stations 14 by transmission of a request synchronization (RSYNC) frame or a mandatory request synchronization (MRSYNC) frame 52. (The RSYNC frame requires only those remote stations 14 desiring access to respond while the MRSYNC requires all remote stations 14 to respond.) The remote stations 14 identify the RSYNC or MRSYNC frames by reference to the type field of the frame (FIGS. 4A–C). In addition to identifying the beginning of the superframe, the RSYNC or MRSYNC frame 52 provides information within the INFO field 34 (FIG. 4A) relative to the number and type of slots (slots using a non-contention based access protocol or a contention based access protocol) within the request period 50. The slot information is used by the remote stations to facilitate system access (to be explained later) or to power-down during the request period 50 if the remote station 14 does not need access to the network 10.

Following the request period 50, the network 10 enters a data period 51. The central station 12 identifies the beginning of the data period 51 to the remote station 14 by transmission of a data descriptor frame 53 (e.g., a data synchronization (DSYNC) or extended data synchronization (EDSYNC) frame). Contained within the INFO field 34 (FIG. 4A) of the DSYNC or EDSYNC frame 53 is temporal information relative to the length of each subsection of the data period 51. The temporal information, as above, is used by the remote stations 14 to reduce a duty cycle of activation by powering-down during appropriate portions of the data period 51.

In accordance with an embodiment of the invention, the slots of the request period are divided into two groups where a first group of slots allows for random access under a contention based protocol (contention slots) and a second group of slots allows for access under a non-contention protocol (reserved slots) (e.g., under an implied polling protocol). Under the invention, the number of contention slots may be constant or may vary based upon an estimate of the number of unregistered remote stations within the service coverage area of the network 10. The number of reserved slots, on the other hand, is adjusted based upon loading. When a remote station 14 is first activated the remote station 14 is granted access to the network 10 under a two-step process. First the remote station 14 transmits an access request within a contention slot. The central station 12 upon receipt of the access request within the contention slot then, as a second step, assigns the remote station 14 to a non-contention slot before finally granting access.

The remote station 14 first monitors for a RSYNC or MRSYNC frame 52. Since the remote station 14 does not yet have a reserved slot, the remote station 14 must access the network 10 through a contention slot. The remote station 14 identifies contention slots by examining the contents of the INFO field 34 of the RSYNC or MRSYNC frame 52. Contained inter alia within the INFO field 34 of the RSYNC or MRSYNC frame (FIG. 4A) is the total number of slots in the request period and the total number of reserved slots. By knowing the location of the reserved and contention slots relative to the RSYNC or MRSYNC frame (e.g., the non-contention slots may immediately follow the RSYNC or MRSYNC frame), the remote station 14 can determine the location of the contention slots. Access may then be secured through a randomly selected contention slot.

Figure 5:
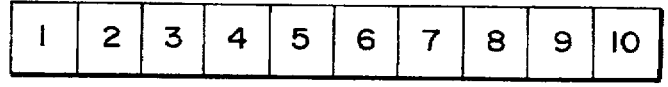
FIG. 5 depicts a slot arrangement used within the request period in accordance with the invention.

By way of example, FIG. 5 depicts a request period having 10 slots. If the reserved slots were designated as being slots 1–7, then slots 8–10 would be the contention slots. An INFO field 34 of a RSYNC or MRSYNC frame 52 in such a case would indicate a total slot number of 10 and a total reserved slot number of 8. Using known methods, the remote station would then randomly generate a number in the range of 1 to 3 and add the randomly selected number to 8 for a final determination of the contention slot to be used in requesting access.

In requesting access to the network 10, the remote station 14 sends a registration request to send (RegRTS) frame (FIG. 4B) within the selected contention slot. The INFO field 34 of the RegRTS frame contains a 48 bit address of the requesting remote station 14 along with coding within the type field that the frame is a RegRTS frame.

Upon receipt of the RegRTS from the remote station 14 by the central station 12, the central station 12 verifies by reference to a memory (not shown) that the address of the remote station 14 that the station is authorized to access the network 10 and that the remote station 14 has a software version compatible with the network 10. Upon verifying that the remote station 14 is an authorized user and is compatible with the network 10, the central station 12 issues a local identifier in favor of the remote station 14. The central station 12, on the other hand, does not immediately transmit the local identification to the remote station. Under the invention the central station waits until the next downward portion of the data period 51 before transmitting the identifier to the requesting remote station 14.

Contained within the local identifier is an identifier of a reserved slot of the request period 50 allocated for use by the remote station 14. The central station 12 may create a reserved slot for the remote station 14 by expanding the length of the request period to 11 slots or may assign the remote station 14 to an unoccupied slot of reserved slots 1–8 (FIG. 5).

Likewise, the central station 12 may de-allocate a slot previously reserved for use by other remote stations 14 based on certain operating parameters. The central station 12 may de-allocate slots for instance where the time since the last use of the slot exceeds some threshold value or if the remote station 14 does not respond to a known number of consecutive MRSYNC frames.

During the next downward period of the data period 51 the central station 12 transmits the local identifier to the remote station 14 through use of a registration clear to send (RegCTS) frame (FIG. 4B). Upon receiving the RegCTS, the remote station retrieves the local identifier and, using the retrieved local identifier, may transmit a Request to Send (RTS) within the designated reserved slot under an implicit polling format during the request period 50 of the next superframe.

Under an alternate embodiment, the remote station 14, upon receipt of a RegCTS may immediately respond by transmitting data. Alternately, a central station 12 may transmit a RegCTS at any time to fill "holes" in the request period (e.g., when a remote station 14 is deactivated or leaves the service coverage area of the network 10).

In general, implicit polling is performed during the request period 50, and explicit polling—of only those remote stations which requested access to the channel—is performed during the data period 51.

To initiate the superframe, the central station broadcasts an RSYNC or MRSYNC frame 52 to all the remote stations. The RSYNC or MRSYNC frame is issued periodically, and it defines the start of a number of time slots of the request period. In the preferred embodiment, the central station sends a RSYNC or MRSYNC frame at least once every second. If there is less data to exchange then the superframe would occur more often, but not more often than once every 100 ms. If there were less data than could be transferred within the 100 ms interval, then the communication channel would be idle for a portion of the 100 ms.

Under an alternate embodiment, an RTS of the remote station 14 specifies the number of data frames it wants to send during the superframe. It is then up to the central station 12 to determine how many times a remote station 14 gets polled. For instance, a central station 12 wouldn't let an entire superframe be "eaten up" by a single station if it requests to be polled too often. Once a request period 50 is complete, the central station 12 has a picture of all upward and downward data periods, and it will divide up the superframe equitably.

A central station 12 may indicate within the RTS frame during the RTS/CTS/DATA/ACK sequence how many frames it will send to the remote station 14 during a superframe. During a DATA/ACK sequence, the use of a "more" bit indicates to the remote station 14 that there is more data to be transmitted during the superframe.

Every remote station has a preassigned waiting period that will begin upon the reception of the RSYNC or MRSYNC frame. These waiting periods are illustrated as time slots TS in FIG. 6, which fill up the remainder of the request period 50.

Since remote station 1 has been assigned the first time slot, it issues a reserved slot request RR frame 54 if it has data to transmit on the channel. Hence, the first time slot has been replaced with the reserved slot request frame $RR_1$ (RTS frame) transmitted from remote station 1. As seen in the example of FIG. 6, no reserved slot request frame was issued in time slot 2 (frame 55), and a reserved slot request frame $RR_3$ was issued from remote station 3 in time slot 3 (frame 56). In the example shown, a maximum number $X-X_C$ (where X is total slots and $X_c$ is contention slots) denotes the number of active remote stations in the network, and, accordingly, the number of preassigned time slots. (See frame 56.) Note that, in this example, the absence of a reserved slot request frame in a time slot represents a negative access request signal to the central station 12. As will be seen below, an alternate embodiment of the protocol always returns either a positive or negative access request signal to the central station upon issuance of a MRSYNC frame.

After every station has been given a chance to make a reservation, the central station will switch to a modified explicit polling mode, wherein it will sequentially issue a CTS frame to every remote station 14 that made a reservation.

Before the central station 12 begins the explicit polling, on the other hand, the central station 12 must describe the data period 50 for the benefit of those remote stations 14 that may wish to power-down for portions of the data period 50. The central station 12 describes the data period 50 to the remote stations 14 by transmitting a DSYNC or EDSYNC frame 53. (The DSYNC and EDSYNC frames differ primarily in the amount of information provided. In general, the EDSYNC allows for a lower duty cycle of remote stations 14).

If either a DSYNC or an EDSYNC frame 53 is used, then the reader will find via reference to FIG. 4A that the length of the polling period for the upward transmission of data is to be found within the INFO field 34 of the DSYNC or EDSYNC frame 53. A remote station not needing to transfer data to the central station 12 may use the time period specified to deactivate its transmitter and receiver until a point just before the broadcast period, where the remote station 14 must again re-activate its receiver for the receipt of system information during the broadcast period.

As illustrated in FIG. 6, the central station polls the first remote station during frame 60 of the upward period with CTS frame $P_1$, since remote station 1 sent its reserved slot request frame $RR_1$ during frame 54. Immediately upon receiving the poll signal addressed to remote station 1, that station responds with its data packet $DATA_1$ during frame 62. The central station then checks its poll list to determine which remote station is to be polled next. In the example shown, remote station 3 is polled via poll frame $P_3$ during frame 64, and it responds with its data packet $DATA_3$ during frame 66. The polling ends upon the completion of the response of the last station on the list, which, in this case, was remote station 3.

Priority message capability is also provided for in the reservation-based polling and data exchange protocol of the present invention. Recall that the control field 32 of the channel frame format 20 (FIG. 2) includes a number of bit-mapped priority flags. In the preferred embodiment, four levels of priority can be implemented using two priority flag bits. If any remote station had a priority message to send, then that station would set its priority flags to the appropriate priority level, and transmit a reserved slot request RR frame to the central station in its preassigned time slot during the reserved slot request period. Upon receipt of this reserved slot request frame containing priority information, the central station would rearrange the poll list into priority-level order. Accordingly, the central station would poll the remote stations in priority-level order.

The timing cycle diagram shown in FIG. 6 can be used to illustrate the reservation-based polling protocol with priority-level polling. Assume that the time slots $TS_1$, $TS_2$, $TS_3$, (frames 54–56) of the reserved slot request period are sequentially assigned to correspond with three remote stations 1–3. If all three remote stations had non-priority messages to send, then each would send its reserved slot request RR frame during the appropriate time slot, and the central station would poll each remote station in numerical order, i.e., the poll list would appear as: $P_1$, $P_2$, $P_3$. If, however, remote station 3 had a level-one priority message to send, and remote station 2 had a level-two priority message to send, then these stations would indicate such using the priority flags in the control fields of their reserved slot request frames. The central station would then re-order its poll list to appear as: $P_3$, $P_1$, $P_2$. Thus, the remote stations are polled in priority-level order. Numerous other multiple-level priority message schemes can be used with the present invention, a few of which will be described below.

FIG. 7 represents a similar timing cycle diagram to that of FIG. 6, with the addition that an acknowledgement (ACK) frame is transmitted from the central station to the remote station after the reception of each data message from the remote station. In order to send an ACK frame, the central station 12 must, first, correctly receive the data message before issuing an ACK frame (FIG. 4C).

The example of FIG. 7 illustrates that, during the reservation request period, remote stations 1 and 3 have transmitted reserved slot request frames 54 and 56, respectively. Therefore, during the upward data transfer period, each of these two remote stations is polled. As before, a first poll frame $P_1$ is issued from the central station in frame 60, and data packet $DATA_1$ from remote station 1 is returned during frame 62. However, now an acknowledgement frame $AK_1$ is sent from the central station to remote station 1 during frame 63. A similar polling/data transfer/acknowledgement sequence occurs for remote station 3 during frames 64, 66, and 67. As only partially shown in FIG. 7, remote station $X-X_c$ was polled, it transmitted its data packet, and its acknowledgment frame $AK_x$ is shown being returned during frame 69.

If the remote station 14 does not receive an acknowledgement (ACK) from the central station 12 following a data transfer (or does not get polled), then the remote station 14 sends a reserved slot request (RR) during the next request period 50. If the remote station 14 does not get a response after 3 tries, the data is discarded.

The broadcast period follows the upward period. Any stations which may have de-activated during the upward period must re-activate for the broadcast period. During the broadcast period, data is broadcast from the central station 12 to all remote stations 14. Data frames (FIG. 4C) during the broadcast period are sent with the broadcast DID (e.g., FFFF hexadecimal). Broadcast data frames are not preceded by an RTS/CTS exchange and are not acknowledged by receiving remote stations 14. If there is no broadcast data to be sent from the central station 12 to the remote stations 14, then an EDSYNC frame 53 at the beginning of the data period 51 may be used to indicate a broadcast length of zero.

Following the broadcast period is the downward data period. If the data descriptor 53 at the beginning of the data period 51 were a DSYNC frame, then all remote stations 14 must remain activated during the downward data period.

If, on the other hand, the data descriptor 53 were a EDSYNC frame, then the contents of the EDSYNC would provide advance notification of which remote station(s) 14 would receive data and, therefore, which remote stations 14 would remain activated during the downward data period. Other remote stations 14 not present within the list of the EDSYNC frame may deactivate for the duration of the downward data period.

Data transfer from the central station 12 to the remote stations 14 during the downward period may occur under either of two possible scenarios. The central station may either transmit an RTS and wait for a CTS before transmitting the data, or may simply transmit a data frame and wait for an acknowledgement response. The use of the RTS by the central station 12 avoids the unnecessary transmission of data when the remote station 14 may not be within range of the central station 12. The use of the RTS/CTS exchange, on the other hand, causes more overall data traffic between the central station 12 and remote station 14.

If the remote station received an erroneous data message, then a negative acknowledgment frame would be returned to the central station. If the central station received neither an acknowledgement frame nor a negative acknowledgement frame from the remote station, then the central station would retransmit the same data message in the next superframe.

Where the RTS/CTS/DATA/ACK sequence is used and there is no response to the RTS, or if the CTS is received with errors, or if after the RTS/CTS/DATA sequence, the ACK isn't received, or if the ACK is received with errors, then the central station 12 begins its retransmission with the retry bit of the RTS frame set. On the other hand, where the DATA/ACK sequence is used and there is no ACK received, or if the ACK is received with errors, then the central station begins its retransmission with the retry bit of the DATA frame set.

Depending upon the requirements of the particular data communication system, it may be advantageous for the central station to track and report on the number of active remote stations in the network—whether or not each remote station has a data message to send. For this purpose, the central controller would issue a mandatory request synchronization (MRSYNC) frame to all of the remote stations. When a remote station receives this frame, it responds with a RTS frame if it has data to send, or it responds with a forfeit (FORF) frame if it does not. If a particular remote station does not respond to the global reservation sync frame, then the central station assumes that the particular remote station 14 is not presently active. In this manner, all of the active remote stations will be accounted for by the system without affecting the throughput of the data communications channel.

Periodically, the central station issues a frame (RSYNC, MRSYNC, DSYNC, or EDSYNC) including a superframe number. The superframe number may be used by the remote stations 14 as a functional check of proper operation (e.g., that a particular sleep mode interval did not cause a remote station 14 to miss part of a superframe).

The timing diagrams of FIGS. 8a and 8b illustrate the sleep mode of remote station 3. During the sleep mode, the controller in the remote station 14 may disable the infrared transmitter and/or receiver circuitry, as well as any other circuitry such as a communications processor which is not being used at the time. This sleep mode ensures minimum power consumption to extend the life of the battery. FIG. 8a represents the power consumption of the remote station receiver, and FIG. 8b represents the power consumption of the remote station transmitter. These two timing diagrams correspond to the timing cycle shown in FIG. 7, wherein acknowledgment frames are utilized.

Since the reservation sync frames 52 and descriptor frames 53 are substantially periodic, the remote station can be programmed to periodically enable its receiver to wait for a reservation sync frame 52 and descriptor frame 53. Accordingly, as shown in FIG. 8a, the receiver of remote station 3 is turned on at time $t_0$, which precedes the occurrence of the reservation sync frame RS at time $t_1$ by a sufficient amount to account for clock tolerances. After the reservation sync frame has been received, the receiver is disabled at time $t_2$.

At time $t_3$, the transmitter circuitry is enabled such that the reservation request frame $RR_3$ can be transmitted during time slot 3. At time $t_4$, the transmitter returns to the sleep mode. At time $t_5$, the reservation request period has ended, and the polled data transfer period (upward period) has begun.

In general, if the remote station 14 has requested access to the network than at least the receiver needs to remain active during the upward period for the receipt of polling messages. Upon receipt of a polling message, directed to the remote station, the receiver may be deactivated and the transmitter activated. Also, if the descriptor for the data period 51 is a DSYNC frame, then the remote station 14 must remain active for the broadcast period and for the downward period. Further, if a frame directed to the remote station 14 is detected by the remote station 14, then the transmitter of the remote station 14 must be activated for transmission of acknowledgement message.

If the descriptor 53 of the data period 51 is a EDSYNC frame, then the remote station 14 shuts down unless otherwise required. If the remote station 14 has transmitted an access request during the request period, then the receiver of the remote station 14 would remain active until polled, at which time the receiver would deactivate and the transmitter activate for transmission of the data frame. At the end of the data frame the transmitter would again deactivate and the receiver activate for receipt of the acknowledgement frame from the central controller 12. Likewise, the remote station would only activate for the broadcast period if the EDSYNC message indicated that the broadcast period would have a non-zero time period, or if a data frame were to be directed to the mobile station 14 during the downward period.

Accordingly, remote station 3 (FIG. 8a) must enable its receiver such that it can wait for its poll frame $P_3$. At time $t_6$, the poll $P_3$ has been received such that the receiver can be disabled. However, the transmitter is immediately enabled since data packet $DATA_3$ must be transmitted during frame 66. From times $t_7$ to $t_8$, acknowledgement frame $AK_3$ is being received by remote station 3. After time $t_8$, the receiver of the remote station can return to its sleep mode until the broadcast period and downward period. Where a DSYNC descriptor 53 is received and if no messages were received by the remote station 3 (as depicted in FIG. 8a) (under either DSYNC or EDSYNC descriptors 53), then at least the transmitter will remain deactivated until the next superframe. As can now be seen, the sleep mode is used by the remote station to conserve battery power when the central station 12 is communicating with other remote stations 14. Various other sleep mode configurations may also be used, particularly since many of the communications processors used in the remote stations may include their own internal power conservation circuits and software.

Figure 9:
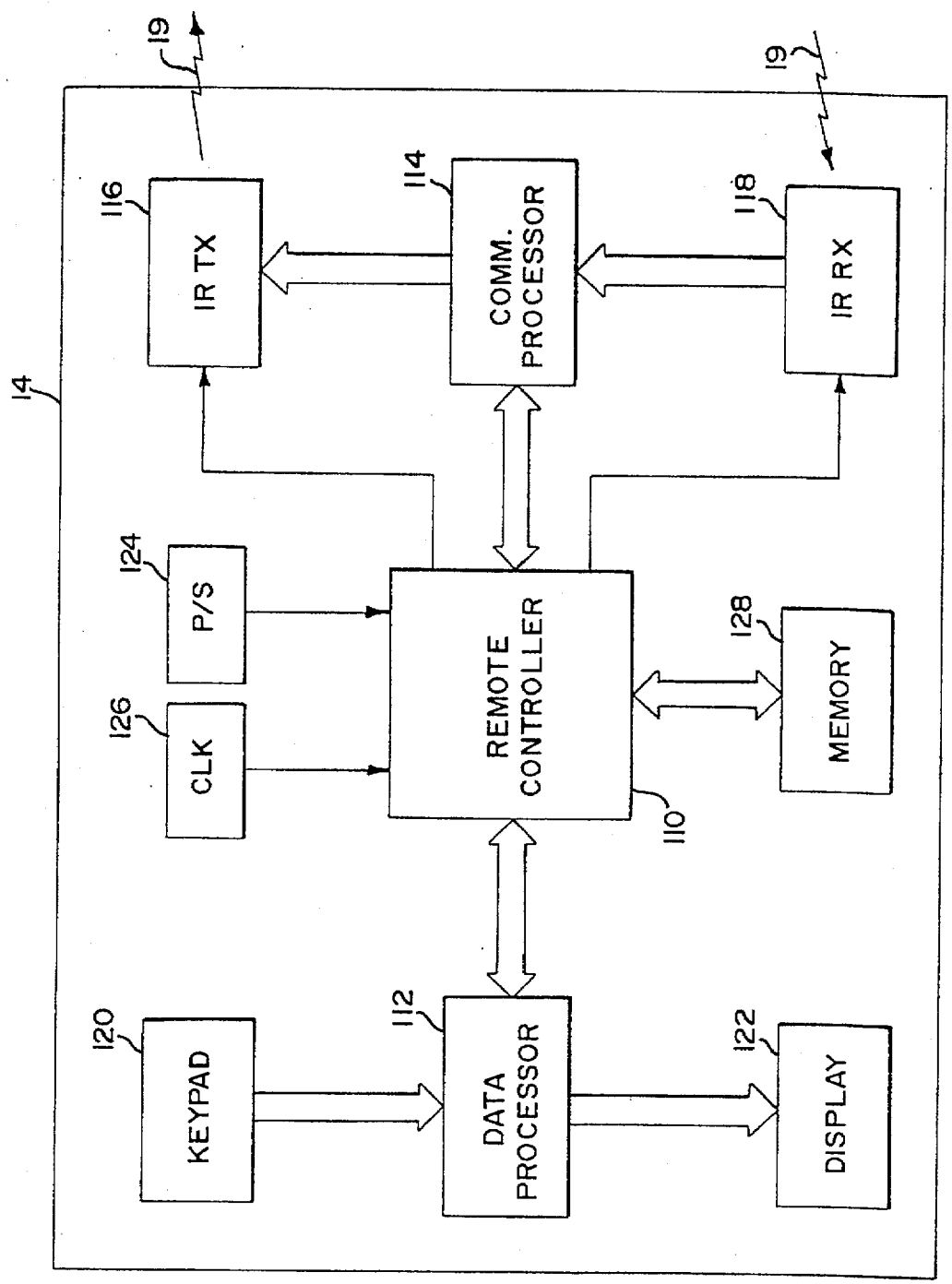
FIG. 9 is a detailed block diagram of one of the remote stations of the data communications network shown in FIG. 1.

Referring now to FIG. 9, a detailed block diagram of one of the remote stations is shown. As described above, each remote station 14 includes a transceiver which communicates with the central station via an optical-infrared data link 19. The heart of the remote station is a remote controller 110 which, in the preferred embodiment, is a Motorola 68EC000, available from Motorola Corporation, operating at 8 Mhz. Remote controller 110 interfaces with a data processor 112 and a communications processor 114, such that data processor 112 can communicate over the infrared link using the polling protocol described above. In the preferred embodiment, data processor 112 may be part of an EPSON Model No. H1001BEW hand-held computer, and communications processor 114 may be an 82590 LAN interface chip also available from Intel or may be a Field Programmable Gate Array (FPGA) with custom programmed logic provided by Spectrix Corp., of Evanston, Ill.

Communications processor 114, in turn, controls an infrared transmitter 116 and an infrared receiver 118. Infrared transmitters and receivers are well-known in the art. In order to perform the control of the sleep mode for the remote station, remote controller 110 also controls the application of power from power supply 124 to the transmitter and receiver blocks. In the preferred embodiment, power supply 124 is contained within the hand-held computer of the remote station 14. A clock 126 and a memory 128 are also connected to remote controller 110 in order to perform the synchronization and station identification functions of each remote station.

Figure 10:
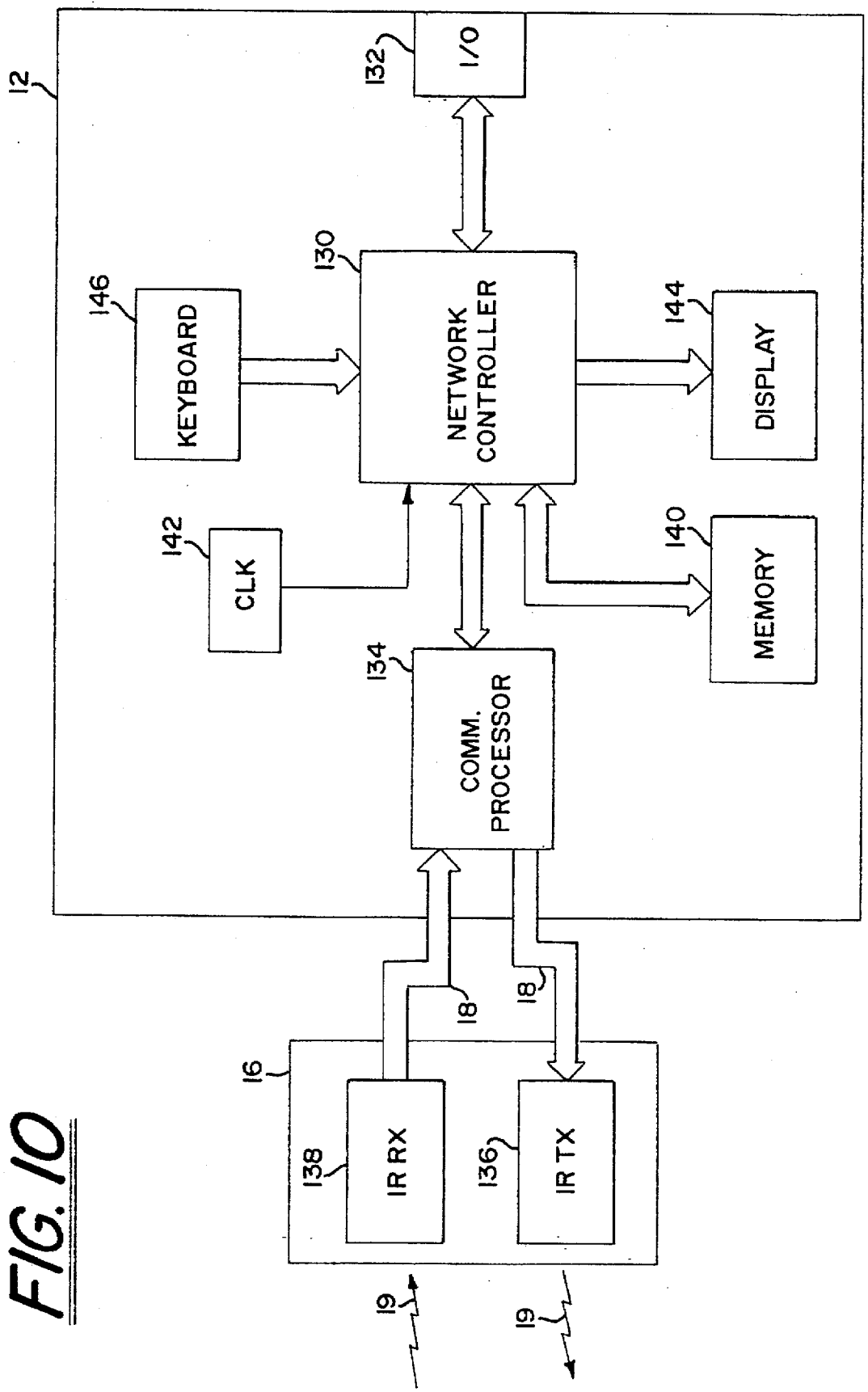
FIG. 10 is a detailed block diagram of the central station of the data communications network of FIG. 1.

FIG. 10 is a detailed block diagram of central station 12 of the data communications network shown in FIG. 1. In order to communicate with the remote stations, the central station includes an external transceiver 16. In the preferred embodiment, infrared transceiver 16 is located at a distance from central station 12, since a personal computer is used for the network controller and since the infrared link must be direct line-of-sight. A network controller 130 interfaces an input/output port 132 to a communications processor 134 such that the reservation-based polling protocol of the present invention is used to transmit and receive data from infrared link 19 to I/O port 132 via infrared transmitter 136, infrared receiver 138, and hard-wired link 18. In the preferred embodiment, the function of network controller 130 is performed by an IBM-compatible personal computer using a DOS-based operating system. The personal computer typically includes a memory 140, a clock 142, a display 144, and a keyboard 146.

In review, it can now be seen that the present invention provides an improved contention and noncontention-based multiple-access signalling protocol for a data communications network which efficiently utilizes a single channel even when only a fraction of the users have data messages to send at a given time. The reservation-based polling protocol is particularly adapted for use with a large number of portable battery-powered computer devices communicating with a central station via an infrared link.

While specific embodiments of the present invention have been shown and described herein, further modifications and improvements may be made by those skilled in the art. All such modifications which retain the basic underlying principles disclosed and claimed herein are within the scope of the invention.

I claim:

1. An apparatus for exchanging data between a central station and a plurality of wireless remote stations on a time divided multiple access communication channel comprising: means for receiving access requests from remote stations of the plurality of remote stations during a first time interval under a contention based protocol and a non-contention based protocol; and means for authorizing a data transfer during a second time period by a remote station providing an access request under a non-contention based protocol of the plurality of remote stations providing access requests under the contention and non-contention based protocols during the first time period.

2. The apparatus as in claim 1 wherein the means for receiving access requests from remote stations of the plurality of remote stations during the first time interval under said contention based protocol and said non-contention based protocol further comprises a plurality of time division multiple access slots within the first time interval.

3. The apparatus as in claim 2 wherein the means for receiving access requests from remote stations of the plurality of remote stations during the first time interval under said contention based protocol and said non-contention based protocol further comprising means, located within a slot of the plurality of slots, for identifying contention slots and non-contention slots to the plurality of remote stations.

4. The apparatus as in claim 3 further comprising means for receiving an access request from a remote station of the plurality of remote stations within an identified contention slot and allocating a non-contention slot to the requesting remote station.

5. An apparatus for reducing a duty-cycle of activation of a remote station exchanging data with a central station on a wireless time divided multiple access communication channel comprising: means for receiving an access request from the remote station during a first time interval under one of a contention based protocol and a non-contention based protocol; means for exchanging data during a second time period with the remote station providing the access request under the non-contention based protocol during the first time period for data transfers; and means for providing a temporal length of the first and second time periods to the remote station by the central station.

\* \* \* \* \*